(12) United States Patent
Endo

(10) Patent No.: US 6,724,101 B2
(45) Date of Patent: Apr. 20, 2004

(54) MOUNTED-INTO-AUTOMOBILE DEVICE

(75) Inventor: Hiroyoshi Endo, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 98 days.

(21) Appl. No.: 09/779,473

(22) Filed: Feb. 9, 2001

(65) Prior Publication Data

US 2001/0017484 A1 Aug. 30, 2001

(30) Foreign Application Priority Data

Feb. 14, 2000 (JP) .................................... P. 2000-035122

(51) Int. Cl.$^7$ .................................................. B60L 1/00
(52) U.S. Cl. .................................... 307/9.1; 307/10.1
(58) Field of Search ............................... 307/9.1, 10.1; 361/814, 728; 381/86

(56) References Cited

U.S. PATENT DOCUMENTS

| 4,134,070 | A |   | 1/1979  | Henderson et al. |         |
|-----------|---|---|---------|------------------|---------|
| 4,513,405 | A | * | 4/1985  | Hills            | 369/12  |
| 5,109,420 | A | * | 4/1992  | Nonaka           | 381/86  |
| 5,127,057 | A | * | 6/1992  | Chapman          | 381/86  |
| 5,229,925 | A | * | 7/1993  | Spencer et al.   | 361/814 |
| 5,299,265 | A | * | 3/1994  | Hayama et al.    | 340/5.8 |
| 5,349,326 | A | * | 9/1994  | Yamada           | 340/426 |
| 5,546,273 | A |   | 8/1996  | Harris           |         |
| 5,546,573 | A | * | 8/1996  | Obermann et al.  | 707/101 |
| 5,610,376 | A |   | 3/1997  | Takagi et al.    |         |
| 5,612,577 | A | * | 3/1997  | Schmidt et al.   | 180/322 |
| 5,619,515 | A |   | 4/1997  | Hayama           |         |
| 5,794,164 | A | * | 8/1998  | Beckert et al.   | 455/3.06|
| 5,803,043 | A | * | 9/1998  | Bayron et al.    | 123/335 |
| 5,857,726 | A | * | 1/1999  | Yokoyama et al.  | 180/90  |
| 6,164,531 | A | * | 12/2000 | Harris et al.    | 235/380 |
| 6,201,540 | B1| * | 3/2001  | Gallup et al.    | 345/764 |
| 6,202,008 | B1| * | 3/2001  | Beckert et al.   | 701/33  |
| 6,483,428 | B1| * | 11/2002 | Fish et al.      | 340/425.5|
| 6,504,731 | B2| * | 1/2003  | Okamoto          | 361/826 |
| 2002/0084700 | A1 | * | 7/2002 | DeLeeuw        |         |

FOREIGN PATENT DOCUMENTS

| DE | 3924894 A1 | * | 1/1991 |
| EP | 0 647 546 A1 |   | 4/1995 |

OTHER PUBLICATIONS

English Translation of Abstract of Pub. No. DE003924894A1, Pub. Date: Jan. 1991.*
WIPO WO 01/58062 A3, Pasieka et al., Pub. Date: Jan. 17, 2001.*
Merriam Webster's Collegiate Dictionary, 10$^{th}$ Ed., p. 1345, ©1999.*
European Search Report dated Jun. 27, 2001 for application No. 01103241.4–2306.

* cited by examiner

Primary Examiner—Gregory J. Toatley, Jr.
Assistant Examiner—Sharon A. Polk
(74) Attorney, Agent, or Firm—McGinn & Gibb, PLLC

(57) ABSTRACT

In a mounted-into-automobile device having a mounted-into-automobile device body and a faceplate 15 attached to this mounted-into-automobile device body detachably, the faceplate 15 is composed of a faceplate for right steering wheel car and a faceplate for left steering wheel car, and both the faceplates 15 are constituted so that they can be connected to the mounted-into-automobile device body.

10 Claims, 5 Drawing Sheets

FACEPLATE FOR LEFT STEERING WHEEL CAR

FACEPLATE FOR LIGHT STEERING WHEEL CAR

MOUNTED-INTO-AUTOMOBILE DEVICE

BACKGROUND OF THE INVENTION

The present invention relates to a mounted-into-automobile device having a detachable faceplate.

Generally, a mounted-into-automobile device is known in which there are provided a body of the mounted-into-automobile device, such as a mounted-into-automobile system provided with components of a car audio system or a personal computer, and a faceplate (DCP: Detachable Control Panel) that is detachably attached to this mounted-into-automobile device body. This faceplate can be taken out of a car in order to prevent it from being stolen when the owner goes away from the car.

In this kind of the mounted-into-automobile device, a faceplate for a right-steering-wheel car and a faceplate for a left-steering-wheel car are prepared as appropriate. In consideration of aspects such as the visual field from a driver, ease of operation, covering of the display with the operating hand and arm, and the like, a faceplate design (arrangement of buttons, display and the like) is made on the assumption that a right steering wheel is used in a car for Japan, and on the assumption that a left steering wheel is used in a car for the U.S.A or Europe.

Thus, a system for Japan is offered with a faceplate for a right-steering-wheel car set in a Japanese version operating system (hereinafter referred to as OS). A system for the U.S.A or Europe is offered with a faceplate for a left-steering-wheel car set in the English version OS.

However, in the above conventional constitution, there is a problem that optimum user interface cannot be obtained.

For example, supose that a mounted-into-automobile device of the Japanese version OS is mounted into a car imported to Japan as a left-steering-wheel car, and the faceplate is for a right-steering-wheel car. Therefore, the faceplate for a right-steering-wheel car is attached to the left-steering-wheel car, and the optimum user interface is not obtained.

In order to solve this problem, not only the faceplate but also the mounted-into-automobile device must be manufactured, classified into one for right-steering-wheel car and one for left-steering-wheel car, and one for a Japanese OS and one for an English OS, causing a problem that manufacturing costs increase.

SUMMARY OF THE INVENTION

Therefore, an object of the invention is to solve the problems of the above-mentioned conventional art and to provide a mounted-into-automobile device that can obtain optimum user interface with simple constitution and at a low cost.

The first aspect of the invention is characterized in a mounted-into-automobile device comprising an attaching portion to which a faceplate is be detachably attached, wherein either one of a faceplate for a right-steering-wheel car and a faceplate for a left-steering-wheel car is capable to be attached to the attaching portion.

The second aspect of the invention is characterized in that of the first aspect of the invention, the mounted-into-automobile device, further comprises a memory means in which an operating system is stored rewritably, wherein the operating system is constituted rewritably according to the faceplate that is attached.

The third aspect of the invention is characterized in a mounted-into-automobile device comprising an attaching portion to which a faceplate is be detachably attached, recognizing means that recognizes classification data of the faceplate that is attached to the attaching portion, and specification setting means that sets operating specification on the basis of the classification data that is recognized by the recognizing means.

The fourth aspect of the invention is characterized in that of the third aspect of the invention, the mounted-into-automobile device, the specification setting means includes a memory means that stores a plurality of operation programs corresponding to the classification data, and a selection means that selects the operation program on the basis of the classification data.

The fifth aspect of the invention is characterized in that of the third or fourth aspect of the invention, the mounted-into-automobile device, the classification data represents a classification of the faceplate for right steering wheel car/for left steering wheel car.

The sixth aspect of the invention is characterized in that in the third or fourth aspect of the invention, the mounted-into-automobile device, the classification data represents a language.

DETAILED DESCRIPTION OF THE PREFERRED EMBODIMENTS

One mode for carrying out the invention will be described below with reference to the drawings.

Figure 1:
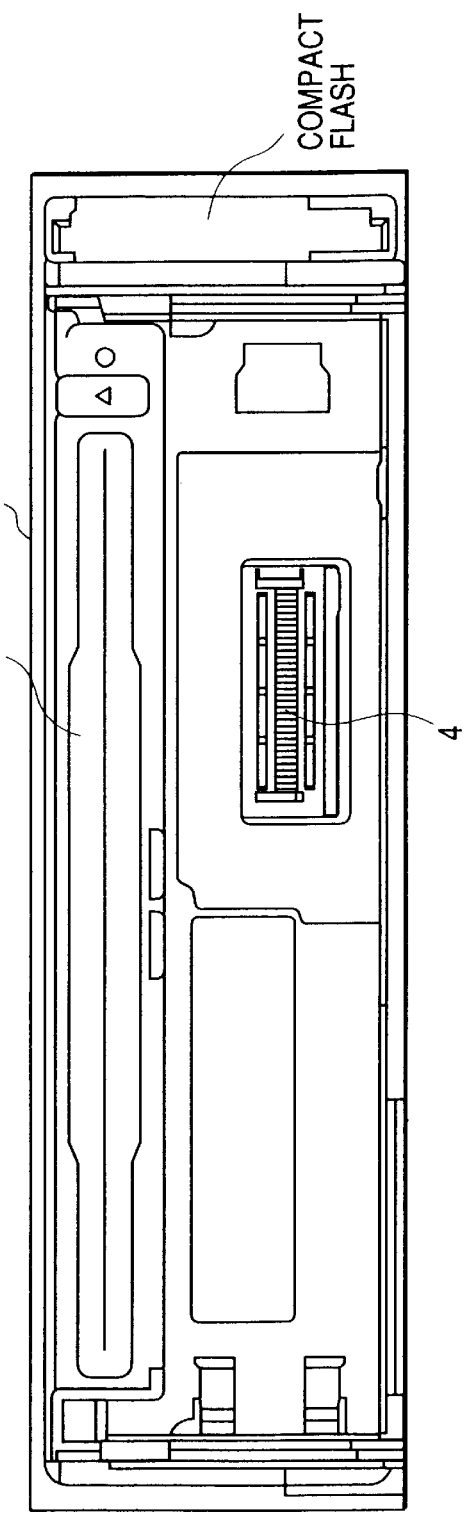
FIG. 1 is a front view of a mounted-into-automobile device body.
Figure 2:
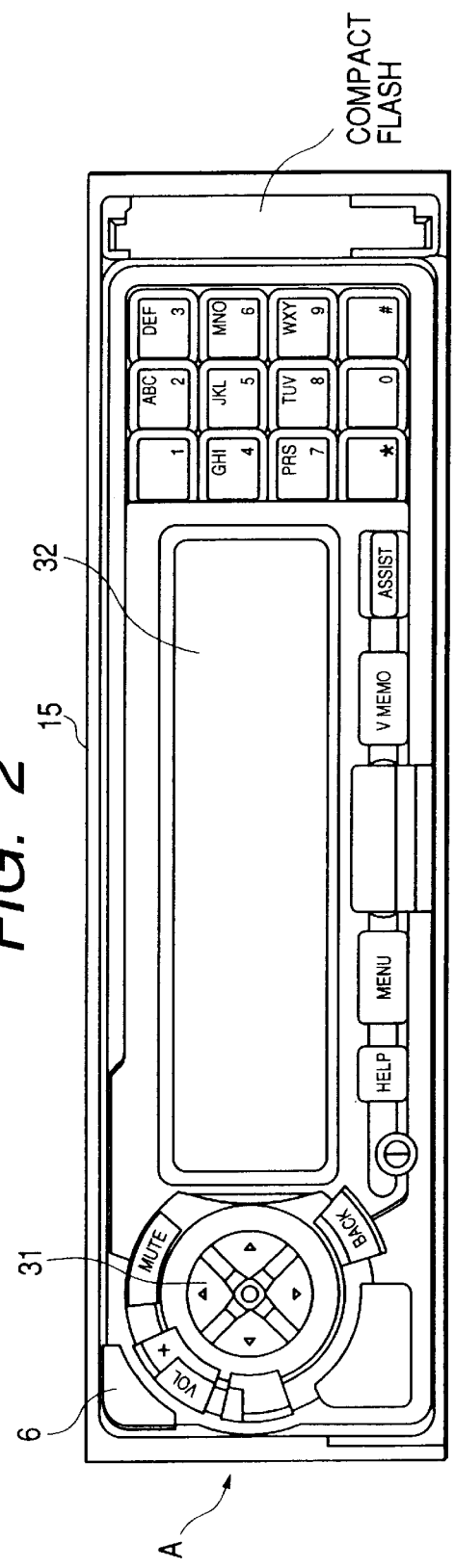
FIG. 2 is a front view of a faceplate.
Figure 3:
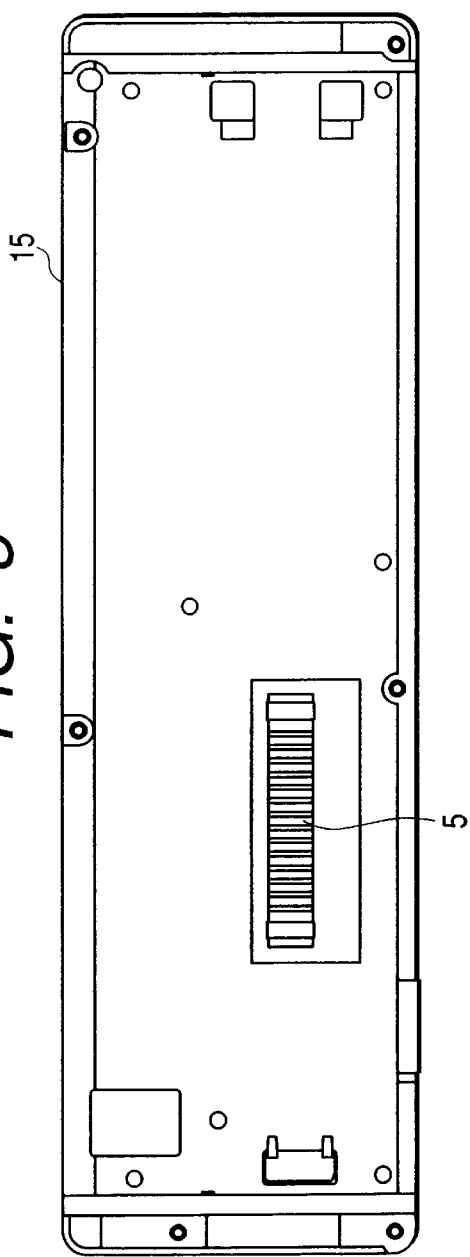
FIG. 3 is a back view of the faceplate.

FIG. 1 is a front view of a mounted-into-automobile device body. In front of this mounted-into-automobile device body 1, an insertion port 2 to insert a recording medium such as a CD, MD and the like is formed, and also a connector contact 4 is formed. To this mounted-into-automobile device body, a faceplate (DCP: Detachable Control Panel) 15 shown in FIGS. 2 and 3 is attached detachably. At the back of this faceplate 15, a connector contact 5 is formed, which is connected to the above connector contact 4 of the mounted-into-automobile device body 1 when the faceplate 15 is attached to the mounted-into-automobile device body 1.

When this faceplate 15 has been attached to the mounted-into-automobile device body 1, a command signal by button operation from the faceplate 15 side, a signal for performing display on LCD of the faceplate 15, infrared remote control data, and the like, are transmitted through the above-mentioned connector 4, 5 contacts.

In the example faceplate, the faceplate 15 can be detached from the mounted-into-automobile device body 1 by operating a button 6 located on the upper left in FIG. 2. In a mounted-into-automobile system in which a part of a car audio and a personal computer are mounted, the mountedinto-automobile device body 1 is expensive. Therefore, for the burglarproof purpose, in case that a person goes away from the car, he detaches the faceplate 15 that is an operational portion from the mounted-into-automobile device body and takes it out of the car. Hereby, in case that only the mounted-into-automobile device body 1 having no operational portion is stolen, it cannot be used, so that the theft itself means nothing.

Figure 4:
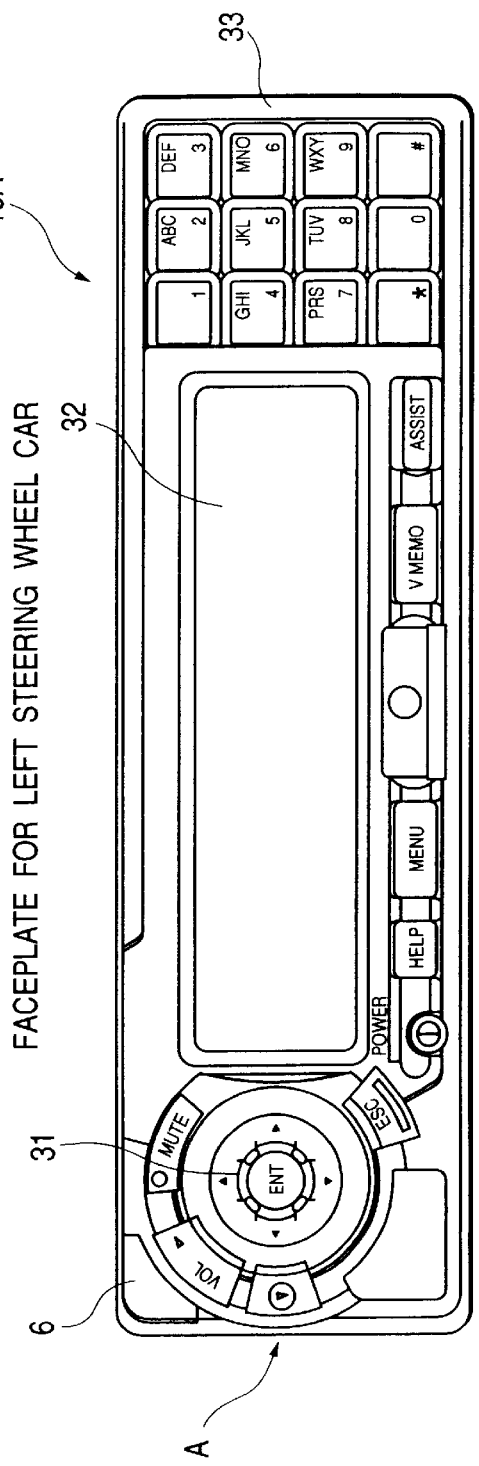
FIG. 4 is a front view of a faceplate for a left-steering-wheel car.
Figure 5:
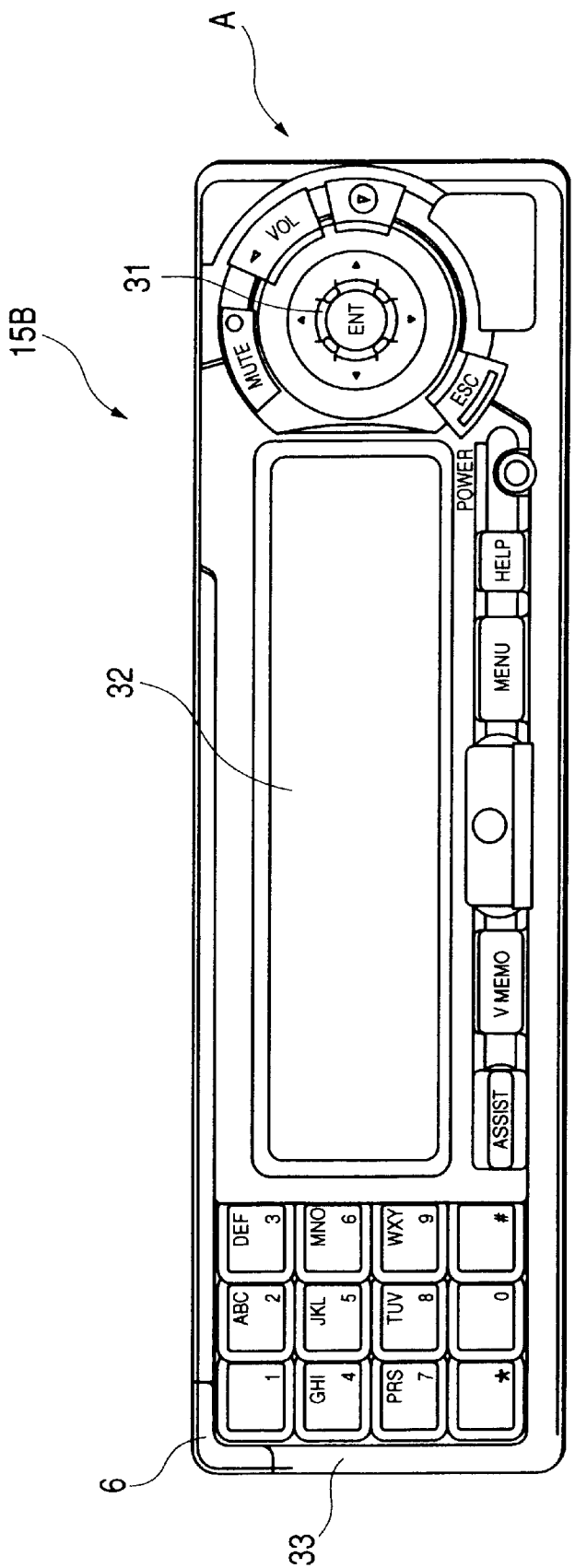
FIG. 5 is a front view of a faceplate for a right steering-wheel-car.

In the faceplate 15, an exemplary faceplate for a right-steering-wheel car and a faceplate for a left-steering-wheel car are shown in FIGS. 5 and 4, respectively.

FIG. 4 shows an exemplary faceplate 15A for a left-steering-wheel car. A button group A used much is arranged on a driver side (left side). A cursor key 31 is arranged on the left side so that display 32 is not covered with the driver's hand or arm when the cursor key is operated. On the upper left of the faceplate is the button 6 for faceplate detachment. Keys 33 for dialing and character input is arranged in a keypad on the right side of the display. FIG. 5 shows an exemplary faceplate 15 B for a right-steering-wheel car. In this case, members other than the button 6 for faceplate detachment are arranged so that they and those in the faceplate 15A for the left-steering-wheel car are bisymmetrical. The cursor key 31 and the keys 33 are each considered as a block group, and the button arrangement in each blocked button group in the faceplate 15B is the same as that in the faceplate 15A (for example, the order of the keypad is 1, 2, 3. . . from the upper left).

Figure 6:
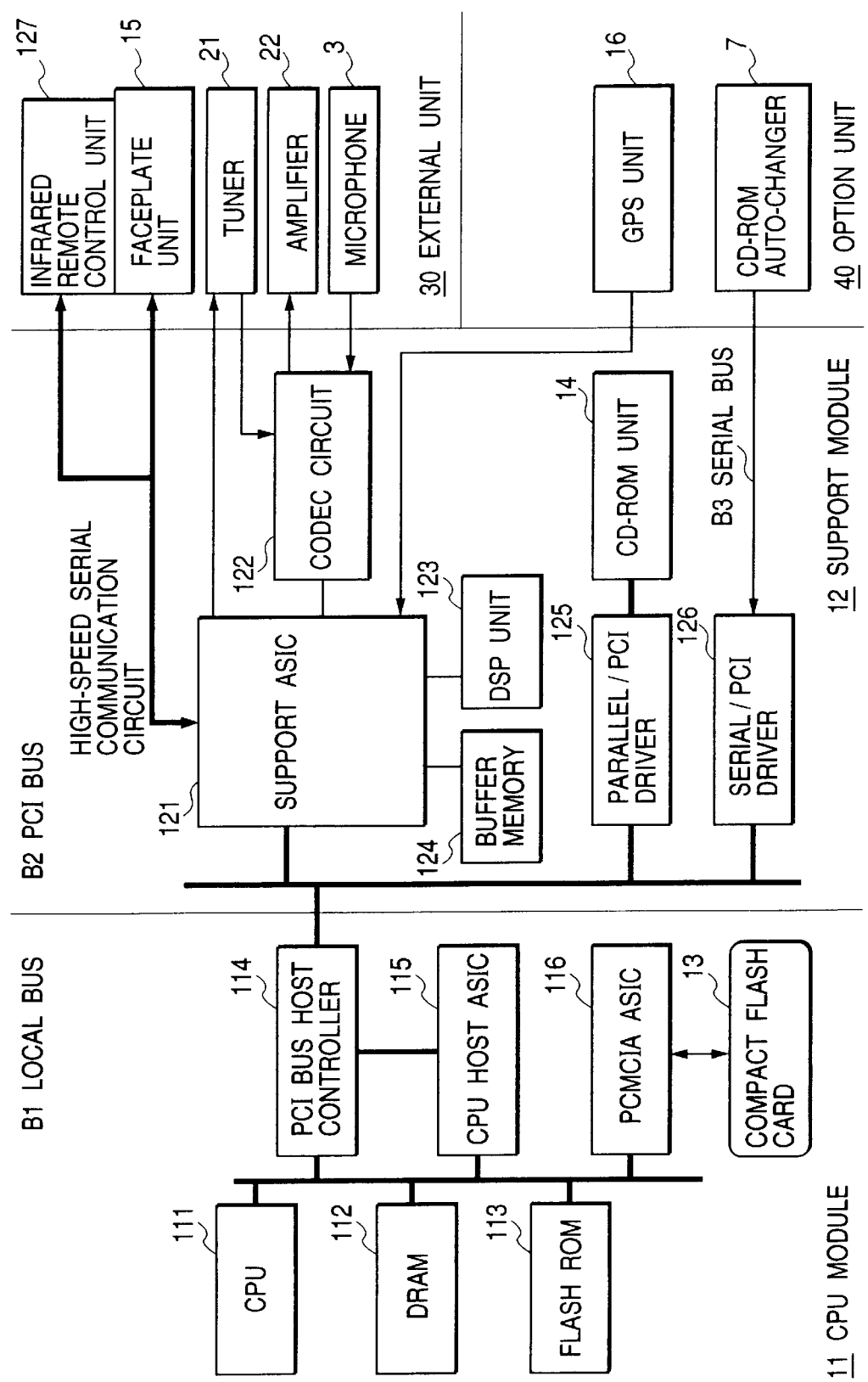
FIG. 6 is a block diagram showing one mode for carrying out the invention.

FIG. 6 is a block diagram of this system.

The whole of this figure is shown divided into four modules. A CPU module 11 is located on the left of the center, a support module 12 is located in the center, an external unit 30 is located on the upper right, and an option unit 40 is located on the lower right. The CPU module 11 and the support module 12 of them are provided inside of the mounted-into-automobile device 1.

The external unit 30 and the option unit 40 indicate respectively some devices connected to the mounted-into-automobile device body 1 as a group. In FIG. 6, for convenience of explanation, a compact flash card 13 is shown in the CPU module 11, and a faceplate 15 is shown in the external unit 30. The CPU module 11 and the support module 12 constitute a control computer that controls the whole of this system. The CPU module 11 performs logical operations using CPU 111, and the support module 12 performs input and output of data between CPU module 11 and other devices included in this system.

In the CPU module 11, a main path of data is a local bus B1 formed with the CPU 111 being central. On the other hand, in the support module 12, a main path of data is a PCI (Peripheral Component Interconnect) bus B2 for connecting each device.

The local bus B1 of the CPU module 11 fits a mode of the CPU 111; and to this local bus B1, DRAM 112, a flash ROM 113, a PCI bus host controller 114, CPU host ASIC115, and PCMCIA ASIC116 are connected.

DRAM 112 provides a work area such as an area for variables when the CPU 111 performs data processing, such as control of this system.

The flash ROM 113 is rewritable, and stores software such as an OS, a BIOS, and application programs. The function of the OS stored here is to manage resources on a computer, to control input and output including user interface, to execute a program of the predetermined mode and the like. For example, a Windows CE (registered trademark of Microsoft Corporation)-based OS or the like are appropriate.

In this exemplary embodiment for carrying out the invention, an OS, for example, a Japanese version OS is stored in the flash ROM 113. The OS stored in this flash ROM 113 is constituted rewritably using the compact flash card 13. For example, in case that the OS stored there is of Japanese version, it can be rewritten to the English version OS. When initial power is input, the OS in the flash ROM 113 is expanded on the DRAM 112, and usually the OS on the DRAM 112 is executed.

The PCI bus host controller 114 connects to the local bus B1 and the PCI bus B2, and the term converts the data mode of data exchanged between the two buses. The term "ASIC" of the CPU host ASIC 115 is an abridgment of Application Specific Integrated Circuit, and indicates an IC or LSI designed for a specific purpose, as opposed to a general-purpose IC such as ROM, RAM, and CPU. Specifically, CPU host ASIC 115 is an ASIC for interface between the local bus B1 and the PIC bus host controller 114. Namely, this CPU host ASIC 115 becomes a window of the data exchanged between the PCI bus B2 and the CPU module 11. Specifically, instead of the CPU 111 host ASIC 115 performs input and output of data between the CPU module 11 and the outside. Host ASIC 115 also judges whether the data sent from the PCI bus B2 should be passed to CPU 111.

The data that should be passed to the CPU 111 is passed through the local bus B1 to the CPU 111 by the CPU host ASIC 115. For other data, for example, data which need not to be performed by the CPU 111 and which is satisfied by mechanically returning a predetermined response, the host ASIC 115 returns such response.

The PCMCIA.ASIC 116 is a corresponding interface to compact flash card 13, as based on standards of PCMCIA (Personal Computer Memory Card International Association) as being a so-called PC card, and which controls reading and writing of data in relation to the compact flash card 13.

Next, the support module 12 will be described.

The PCI bus B2 of the support module 12 is a bus for exchanging data between the support module 12 and the various devices constituting this system, and constitutes transmission means for transmitting audio data from the devices and digital data in a digital mode. Here, as exemplary devices connected to this PCI bus B2, are the external unit 30 and the option unit 40.

Namely, the external unit 30 is an unit other than the mounted-into-automobile device body 1 (see FIG. 1). In this example, specifically, the unit 30 comprises a faceplate 15 detachable from the mounted-into-automobile device body 1, a tuner 21 and an amplifier 22 provided in a tuner/amplifier unit, and a microphone 3. The faceplate 15 also includes an infrared remote control unit 127.

The option unit 40 is a unit that can be selected as an option to interface with the present inventor. In this example, specifically, the unit 40 comprises a GPS unit 16 and a CD-ROM auto-changer 7.

CD-ROM unit 14 inside the mounted-into-mobile device body 1 is connected to PCI bus B2. This CD-ROM unit 14 is a player for reading out audio data or digital data from a CD or CD-ROM. Since both these CD-ROM auto-changer 7 and CD-ROM unit 14 can read out data from a CD and also can read out data from the CD-ROM, they are compatible.

In order to exchange the data between the support module 12 and these devices, a support ASIC 121, a CODEC circuit 122, DSP unit 123, a buffer memory 124, a parallel/PCI driver 125, and a serial/PCI driver 126 are used.

Support ASIC 121 is a means for determining which data has come from where and is sent to where, between the support module 12 and each device. In other words, it controls communication of data. Further, the term "CODEC" of CODEC circuit 122 is an abbreviation of "Code/Decoder", that is, technology of A/D conversion and D/A conversion of data. This CODEC circuit 122 converts the provided digital data into an analog signal, that is, performs D/A conversion, or that converts the analog signal into a digital signal, that is, performs A/D conversion.

Namely, this CODEC circuit 122 has a function of A/D conversion that converts analog signals provided from a device, such as the tuner or microphone, into digital audio data, and a function of D/A conversion converts the processed audio data into analog signals. Amplifier 22 drives a speaker with the converted analog signals and the CODEC circuit 122 constitutes an audio output means for outputting the processed audio data as analog signals.

The term "DSP" of the DSP unit 123 is an abbreviation of digital sound processor, that is, an abbreviation meaning a circuit that specially processes signals of digital sound. This DSP unit 123, when audio data expressing music and the like is given thereto, processes the audio data so that items such as balance of left and right, volume, fader, surround, and equalizer, as set in the system, are reflected in the sound. Buffer memory 124 is a buffer for making up a difference in cycle of reading and writing data between the audio device such as the CD-ROM unit and the PCI bus B2, by storing data and taking out it as required. Buffer memory 124 is composed of SRAM and the like.

The parallel/PCI driver 125 converts audio data and digital data of the parallel mode into those of the data mode of the PCI bus B2. Further, the serial/PCI driver 126 converts audio data and digital data of a serial mode that are sent from the CD-ROM auto changer 7 in a USB mode into those of a data mode corresponding to the PCI bus B2.

The faceplate 15 including the infrared remote control unit 127 is connected to the support ASCIC 121 through a start-stop synchronization serial communication circuit such as UART (Universal Asynchronous Receiver-Transitter).

The CD-ROM unit 14 is connected to the parallel/PCI driver 125 through a parallel communication circuit such as ATAPI (AT Attachment Packet Interface). The infrared remote control unit 127 is provided with an ASIC (not shown) that performs data exchange by infrared rays. Further, the CPU module 11, and the CODEC circuit 122, the DSP unit 123 and the buffer memory 124 of the support module 12 constitute a processing means for processing the digital audio data and the digital data.

Next, the operation of the mode for carrying out the invention will be described.

In this embodiment, similar to the conventional system, as a system for the U.S.A and Europe, a mounted-into-automobile device is prepared in which a faceplate 15A for a left-steering-wheel car is set in an English-version OS. As a system for Japan, a mounted-into-automobile device is prepared in which a faceplate 15B for a right-steering-wheel car is set in a Japanese-version OS.

And, in case that the left steering wheel car is used in the U.S.A, and Europe, a mounted-into-automobile device is mounted having the English-version OS in combination with the faceplate 15A for the left-steering-wheel car. In case that the right-steering-wheel car is used in Japan, a mounted-into-automobile device is mounted in which the Japanese version OS and the faceplate 15B for the right-steering-wheel car are easily combined as a set.

However, for example, suppose the case that the mounted-into-automobile device of the Japanese version OS is mounted into a car imported to Japan (as a left-steering-wheel car), and the faceplate is the faceplate 15B for the right-steering-wheel car. Therefore, the faceplate for a right-steering-wheel car is attached to the left-steering-wheel car, so that the optimum user interface is not obtained.

With the present invention, in the above imported car, a mounted-into-automobile device in which the English version OS and the faceplate 15A for the left steering wheel car are set are mounted, and the English version OS stored in the flash ROM 113 of this mounted-into-mobile device body 1 is rewritten into the Japanese version OS using the CD or the compact flash card 13.

Hereby, in this mounted-into-automobile device, the Japanese version OS and the faceplate 15A for the left steering wheel car are set. Therefore, in case that a Japanese uses a left steering wheel car, he can obtain the optimum user interface.

The above mode is one example. But it suffices to demonstrate that in the mode of the present invention, by only rewriting the OS stored in the flash ROM 113 of the mounted-into-automobile body 1 and making properly the faceplate for right steering wheel car or the faceplate for left steering wheel car, the optimum user interface can be obtained regardless of the destination, the kind of car, and the like.

Next, processing in case that the application software stored in the flash ROM 113 of the mounted-into-automobile device 1 has a difference between the right steering wheel car and the left steering wheel car will be described as another aspect of the present invention.

Figure 7:
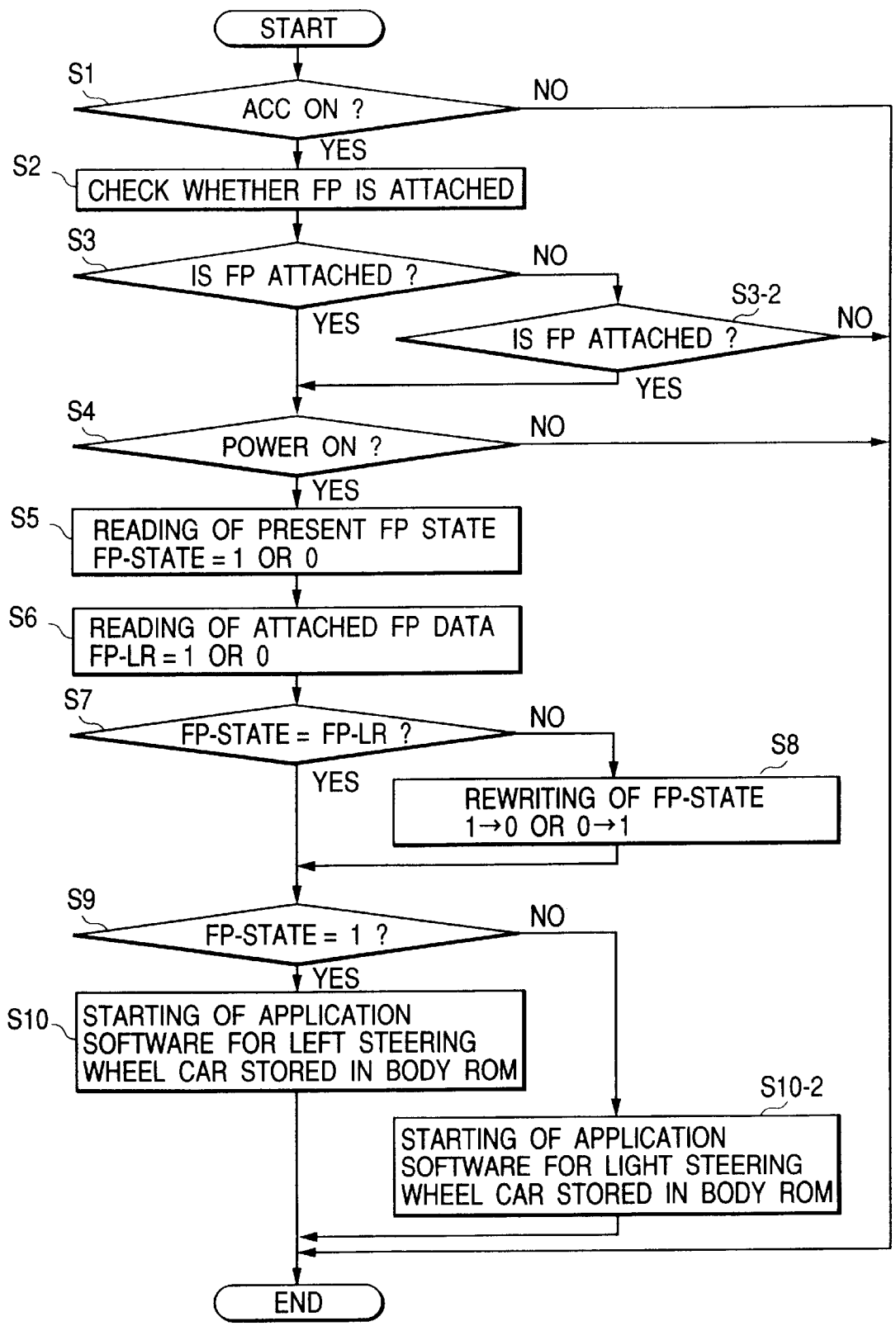
FIG. 7 is a flowchart showing one mode for carrying out the invention.

FIG. 7 is a flowchart of this processing.

First, whether an engine key (ACC) of a car is in ON is judged (S1). In case that the ACC is in the OFF state, the process ends. On the other, in case the ACC is in ON state, whether a faceplate 15 is attached to the mounted-into-automobile device body 1 is checked (S2, S3). In case that this faceplate 15 is not attached to the device body, processing proceeds through a step S3-2 to a step S4, and in case that the faceplate 15 is attached there, the processing proceeds directly to the step S4.

Namely, even if the ACC is in the ON state, in case that the faceplate 15 is not attached, this system does not start.

However, in case that the ACC is ON with this faceplate 15 not attached and thereafter the faceplate 15 is attached, the processing proceeds to the step S3-2 and this system starts after the faceplate 15 has been attached. Then, the system enters Power-On waiting state and the processing proceeds to the step S4. In case that the faceplate 15 is not attached, the process ends.

The above step S4 shows the Power-On waiting state. When Power On is executed using a power button on the faceplate 15, the present faceplate state stored in the DRAM 112, a value (1 or 0) indicating whether the faceplate 15 when the ACC was last turned OFF was for the left-steering-wheel car or the right-steering-wheel car, is read (S5).

And, in a step S6, from a faceplate 15 presently attached, data indicating whether the faceplate 15 is for the left-steering-wheel car or the right-steering-wheel car is read. Then, the result in step S5 is compared with the result in step S6 (S7). If they are the same value, the attached faceplate is taken as being the same faceplate 15 as the faceplate at the last ACC OFF time, and the processing proceeds to step S9. If they are different values, the attached faceplate 15 is taken as being an exchanged faceplate, and the processing proceeds to step 8. In this step 8, the present faceplate state (FP-state) is rewritten to the value of the faceplate 15 presently attached (FP-LR) and the processing proceeds to step S9.

In the step S9, the final state of the faceplate 15 is judged. For example, in case that FP-state=1, the attached faceplate 15 is for the left-steering-wheel car. Therefore, the processing proceeds to step S10 and application software for a left-steering-wheel car stored in the flash ROM 113 is started. Conversely, if FP-state=0, the attached faceplate 15 is for the right steering wheel car. Therefore, the processing proceeds to step S10-2 and application software for a right-steering-wheel car stored in the flash ROM 113 is started.

In this way, when the above processing is executed, firstly, data for a right-steering-wheel car or for a left-steering-wheel car is previously stored in a memory (not shown) of the faceplate 15, and the mounted-into-automobile device body 1 is provided with a faceplate flag indicating which of a left-steering-wheel car or a right-steering-wheel car the faceplate 15 is for. Hereby, which faceplate 15 is attached to the mounted-into-automobile body 1 is recognized, and the processing of changing the application software is automatically executed.

Another technique is a case in which a position displayed on the display 32 is different because of the difference of the faceplate 15.

In this technique, since the application software is changed automatically by the user's selection, the displayed position is automatically corrected.

A registry item of 1-bit is provided for the faceplate 15; at the OS starting time, its registry data is read, and when each application software is set up, either the application software for right or the application software for left is started. If the flash ROM 113 of the mounted-into-automobile device body 1 has sufficient memory capacity, operating systems of several languages may be stored in this flash ROM 113. By inputting a country code to a memory (not shown) of the faceplate 15, the language of the OS is automatically determined, as based on country selected, further, the application software for right or the application software for left is accordingly started by the above registry data.

In this constitution, the data indicating that the faceplate is for the right steering wheel car or for the left steering wheel car is previously stored in the memory of the faceplate 15. Alternatively, rather than storing, this data in the memory of the faceplate 15, a High/Low of a terminal (FP-LR) of the micro computer of the faceplate 15 may represent this data.

In summary, the invention, by exchanging only the faceplate, the user interface that is most suitable for both of the right steering wheel and the left steering wheel can be provided. Further, by rewriting the OS and exchanging the faceplate, the system can also correspond to multiple-languages. Further, an effect that regardless of the language of a user and the kind of car, the optimum user interface possible can be obtained.

What is claimed is:

1. A mounted-into-automobile device, comprising:
   an attaching portion to which a detachable module is to be detachably attached, wherein
   said detachable module comprises a faceplate, said faceplate being any one of a first faceplate designed for a car having a steering wheel on the right side and a second faceplate designed for a car having a steering wheel on the left side, a layout of components on said first faceplate differing from a layout of components on said second faceplate based on a relative location of a person using said mounted-into-automobile device, and said attaching portion accommodates a detachable module having any one of said first faceplate or said second faceplate.

2. The mounted-into-automobile device according to claim 1, further comprising:
   a rewritable memory storing an operating system, said operating system being constituted rewritably according to which one of said first and second faceplates that is attached.

3. A mounted-into-automobile device comprising:
   an attaching portion to which a faceplate module is detachably attachable, said attachable faceplate module including means to provide a control signal that includes a classification data of said faceplate;
   recognizing means connected to said attaching portion mounted in said automobile for recognizing said classification data of said faceplate when attached to said attaching portion, said recognizing based on said control signal; and
   specification setting means for setting at least one operating specification on the basis of the classification data.

4. The mounted-into-automobile device according to claim 3, wherein said specification setting means includes,
   memory means for storing a plurality of operation programs corresponding to the classification data, and
   selection means for selecting the operation program on the basis of the classification data.

5. The mounted-into-automobile device according to claim 3, wherein the classification data comprises an identification of a layout of components on a front face of said faceplate, said layout comprising one of a layout designed to be operated by a user in a car having a steering wheel on the right side and a layout designed to be operated by a user in a car having a steering wheel on the left side.

6. The mounted-into-automobile device according to claim 3, wherein the classification data defines a language as an operating specification.

7. The mounted-into-automobile device according to claim 6, wherein said language is selected by selection of a country code by a user.

8. A detachable control panel for a mounted-into-automobile device, comprising:
   a faceplate on a front face;
   a plurality of control devices arranged on said faceplate to permit control inputs by a user, said control devices being arranged in one of two predetermined layouts, a first of said two predetermined layouts for a user in an automobile having a steering wheel on a first side, and a second of said two predetermined layouts for a user in an automobile having a steering wheel on a second side;
   an attaching portion on a back face to attach said detachable control panel to a mounting body installed in an automobile, said mounting body including a controller to receive signals from said control devices; and
   an identifier to provide a signal to said controller to identify which one of said two predetermined layouts has been incorporated on said faceplate.

9. The detachable control panel of claim 8, wherein said first side comprises a right side and said second side comprises a left side.

10. A mounted-into-automobile system, comprising:

a mounting body installed in an automobile, said mounting body including a controller to receive control inputs from a control panel and to provide output signals based on said control inputs; and a control panel detachably attached to said mounting body, said control panel including a plurality of control devices arranged in one of two predetermined layouts, a first of said two predetermined layouts for a user in an automobile having a steering wheel on the right side, and a second of said two predetermined layouts for a user in an automobile having a steering wheel on the left side, said control panel further providing a signal to said controller to identify which one of said two predetermined layouts has been incorporated on said faceplate.

* * * * *